(12) United States Patent
Du et al.

(10) Patent No.: US 9,625,650 B2
(45) Date of Patent: Apr. 18, 2017

(54) OPTICAL CIRCULATORS INTEGRATED INTO TRANSCEIVERS

(71) Applicant: Finisar Corporation, Sunnyvale, CA (US)

(72) Inventors: Tengda Du, San Jose, CA (US); Jack Xu, Pleasanton, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 145 days.

(21) Appl. No.: 14/458,689

(22) Filed: Aug. 13, 2014

(65) Prior Publication Data

US 2016/0047987 A1    Feb. 18, 2016

(51) Int. Cl.
*G02B 6/27* (2006.01)
*G02B 6/42* (2006.01)
*G02F 1/09* (2006.01)

(52) U.S. Cl.
CPC .......... *G02B 6/2746* (2013.01); *G02B 6/272* (2013.01); *G02B 6/2773* (2013.01); *G02B 6/4246* (2013.01); *G02F 1/093* (2013.01)

(58) Field of Classification Search
CPC .. G02B 6/2746; G02B 6/4246; G02B 6/2773; G02B 6/272; G02B 27/286; G02F 1/0955; G02F 1/093; H04B 10/40; H04B 10/2503

USPC .. 359/246, 238, 245, 484.1, 484.05, 489.07, 359/489.09, 489.18; 385/11, 15, 24, 385/88–90, 100; 398/135, 141
See application file for complete search history.

(56) References Cited

U.S. PATENT DOCUMENTS

2002/0015228 A1* 2/2002 Cao ...................... G02B 27/283
                                                                    359/489.18
2004/0086214 A1    5/2004 Huang et al.

* cited by examiner

*Primary Examiner* — Scott J Sugarman
*Assistant Examiner* — Ibrahima Diedhiou
(74) *Attorney, Agent, or Firm* — Maschoff Brennan

(57) ABSTRACT

An optical circulator integrated into a transceiver for bi-directional communication may include a core configured to pass a transmission signal in a transmit direction and a received signal in a receive direction. The optical circulator may include an input port optically coupled to the core. The input port may be configured to deliver the transmission signal to the core. The optical circulator may include an output port optically coupled to the core. The output port may be configured to receive the received signal from the core. The optical circulator may additionally include a network port optically coupled to the core. The network port may be configured to receive the transmission signal from the core and deliver the transmission signal to a fiber optic cable. The network port may be configured to receive the received signal from the fiber optic cable and deliver the received signal to the core.

20 Claims, 5 Drawing Sheets

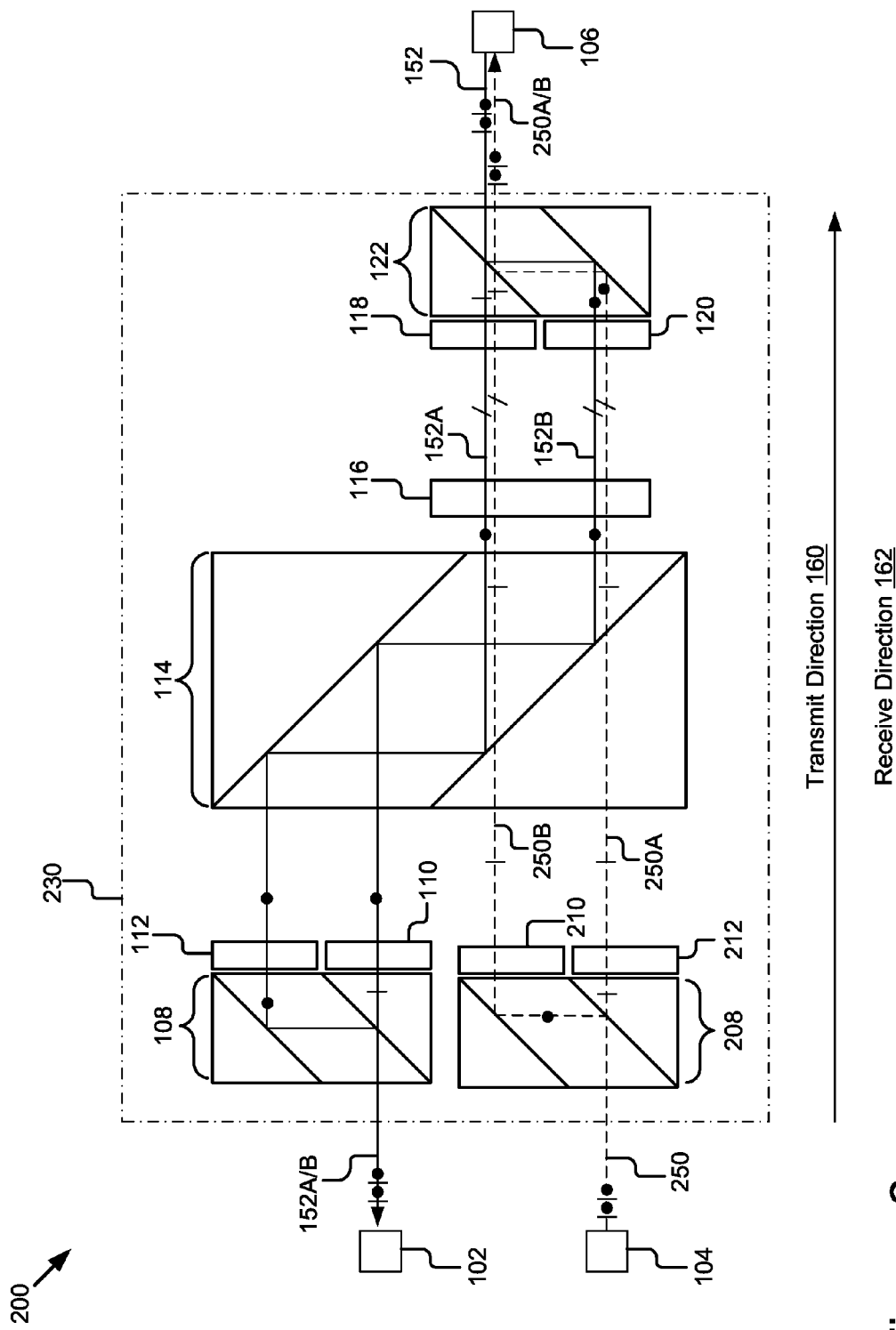

OPTICAL CIRCULATORS INTEGRATED INTO TRANSCEIVERS

FIELD

Some embodiments described herein generally relate to bi-directional fiber optic communications.

BACKGROUND

Unless otherwise indicated herein, the materials described herein are not prior art to the claims in the present application and are not admitted to be prior art by inclusion in this section.

Bi-directional communication using a single fiber optic cable may be accomplished in different ways. For example, existing technologies may use light beams with two different wavelengths and wavelength division multiplexing (WDM) filters to accomplish bi-directional communication through a single fiber optic cable. Two different types of transceivers may be implemented at each communication terminal, which may cause a higher cost compared to implementation of one type of transceiver at a corresponding communication terminal. In another example, light beams with a single wavelength may be used for bi-directional communication through the single fiber optic cable, with a 50/50 splitter being implemented at each communication terminal. However, the 50/50 splitter may cause 3 decibel (dB) power loss at the corresponding communication terminal during a transmission or receiving process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to techniques for bi-directional fiber optic communications.

In an example embodiment, an optical circulator integrated into a transceiver to achieve bi-directional communication in a fiber optic communication network is described. The optical circulator may include a bi-directional propagation core configured to pass a transmission signal in a transmit direction and a received signal in a receive direction. The bi-directional propagation core may include a first polarization beam splitter (PBS), a first polarization shifting assembly optically coupled to the first PBS, a second PBS optically coupled to the first polarization shifting assembly, a second polarization shifting assembly optically coupled to the second PBS, and a third PBS optically coupled to the second polarization shifting assembly. The first polarization shifting assembly may be located between the first PBS and the second PBS, and the second polarization shifting assembly may be located between the second PBS and the third PBS. The bi-directional propagation core may pass the received signal from the first PBS to the third PBS through the first polarization shifting assembly, the second PBS, and the second polarization shifting assembly. The bi-directional propagation core may pass the transmission signal from the second PBS to the first PBS through the first polarization shifting assembly. The optical circulator may additionally include an input port optically coupled to the second PBS of the bi-directional propagation core. The input port may be configured to deliver the transmission signal to the second PBS. The optical circulator may additionally include an output port optically coupled to the third PBS of the bi-directional propagation core. The output port may be configured to receive the received signal from the third PBS. The optical circulator may additionally include a network port optically coupled to the first PBS of the bi-directional propagation core. The network port may be configured to receive the transmission signal from the first PBS and deliver the transmission signal to a fiber optic cable. The network port may be further configured to receive the received signal from the fiber optic cable and deliver the received signal to the first PBS.

In another example embodiment, the optical circulator may include a bi-directional propagation core configured to pass a transmission signal in a transmit direction and a received signal in a receive direction. The bi-directional propagation core may include a first polarization beam splitter (PBS), a first polarization shifting assembly optically coupled to the first PBS, a second PBS optically coupled to the first polarization shifting assembly, a second polarization shifting assembly optically coupled to the second PBS, a third PBS optically coupled to the second polarization shifting assembly, a third polarization shifting assembly optically coupled to the second PBS, and a fourth PBS optically coupled to the third polarization shifting assembly. The bi-directional propagation core may pass the received signal from the first PBS to the third PBS through the first polarization shifting assembly, the second PBS, and the second polarization shifting assembly. The bi-directional propagation core may pass the transmission signal from the fourth PBS to the first PBS through the third polarization shifting assembly, the second PBS, and the first polarization shifting assembly. The optical circulator may additionally include an input port optically coupled to the fourth PBS of the bi-directional propagation core. The input port may be configured to deliver the transmission signal to the fourth PBS. The optical circulator may additionally include an output port optically coupled to the third PBS of the bi-directional propagation core. The output port may be configured to receive the received signal from the third PBS. The optical circulator may additionally include a network port optically coupled to the first PBS of the bi-directional propagation core. The network port may be configured to receive the transmission signal from the first PBS and deliver the transmission signal to a fiber optic cable. The network port may be further configured to receive the received signal from the fiber optic cable and deliver the received signal to the first PBS.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 is a block diagram illustrating another example optical circulator; and

DETAILED DESCRIPTION OF SOME EXAMPLE EMBODIMENTS

Figure 1:
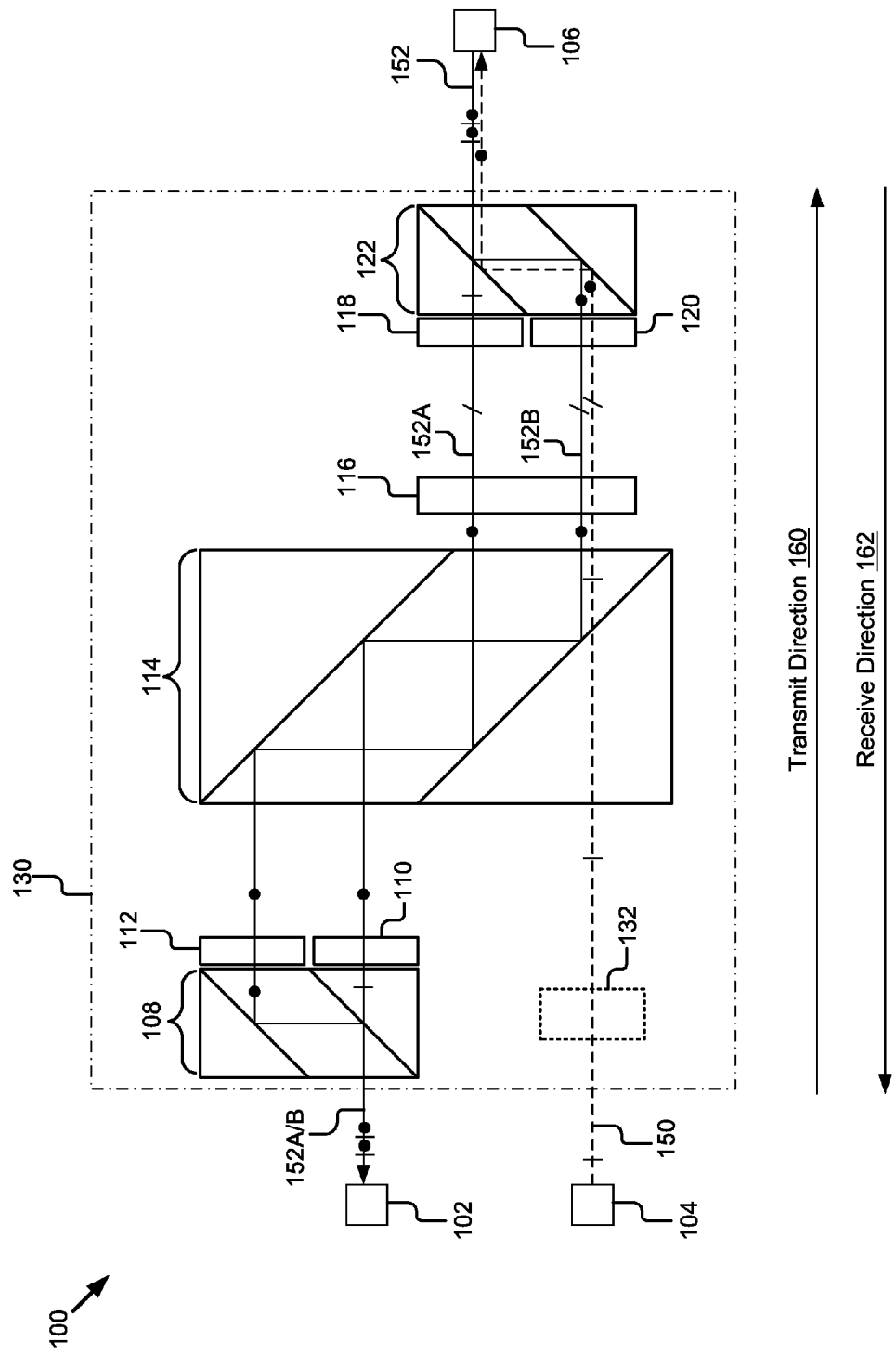
FIG. 1 is a block diagram illustrating an example optical circulator.

Embodiments described herein generally relate to techniques for bi-directional fiber optic communications.

Some embodiments described herein may include an optical circulator integrated into a transceiver, such as an optical subassembly (OSA), for bi-directional communication along a single fiber optic cable in a fiber optic communication network. The optical circulator integrated into the transceiver may be implemented in a single package. Alternately or additionally, the optical circulator may be configured to transmit and/or receive multi-wavelength optical signals such as may be implemented in WDM systems. The optical circulator may include an input port, an output port, a network port, a bi-directional propagation core, and other components suitable for the optical circulator.

The network port may receive a signal from the fiber optic cable in the fiber optic communication network. The received signal may include an unpolarized light beam from the fiber optic communication network. The network port may deliver the received signal to the bi-directional propagation core, and then the bi-directional propagation core may direct the received signal to the output port. The output port may pass the received signal to a photodiode in a transceiver. Simultaneously, the input port may deliver a transmission signal generated by a laser diode to the bi-directional propagation core. The transmission signal may include a linear polarized light beam or an unpolarized light beam. The bi-directional propagation core may direct the transmission signal to the network port, causing the network port to deliver the transmission signal onto the fiber optic communication network.

The bi-directional propagation core may be configured to simultaneously pass the transmission signal from the input port to the network port generally in a transmit direction and the received signal from the network port to the output port generally in a receive direction. The bi-directional propagation core may include various optical components that may pass, reflect, refract, and/or change a polarization state of a signal (e.g., a light beam) that propagates through the bi-directional propagation core.

For example, the bi-directional propagation core may include a first polarization beam splitter (PBS) optically coupled to the network port, a first polarization shifting assembly that includes first wave plates and a Faraday rotator, a second PBS, a second polarization shifting assembly that includes second wave plates, and a third PBS. The input port may be optically coupled to the second PBS for delivering a transmission signal (e.g., a linear polarized light beam) to the second PBS. The transmission signal may propagate through the second PBS, the first polarization shifting assembly, and the first PBS to the network port for transmission onto the fiber optic communication network.

Additionally, the bi-directional propagation core may include a third polarization shifting assembly that includes third wave plates optically coupled to the second PBS, and a fourth PBS optically coupled to the third wave plates. The input port may be optically coupled to the fourth PBS for delivering a transmission signal (e.g., an unpolarized light beam) to the fourth PBS. The transmission signal may propagate through the fourth PBS, the third polarization shifting assembly, the second PBS, the first polarization shifting assembly, and the first PBS to the network port for transmission onto the fiber optic communication network.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 is a block diagram illustrating an example of an optical circulator 100, arranged in accordance with at least some embodiments described herein. The optical circulator 100 may include an input port 104, an output port 102, a network port 106, and a bi-directional propagation core 130. The optical circulator 100 may include any other elements suitable for a circulator but not illustrated in FIG. 1. For example, the optical circulator 100 may include a first lens inserted between the output port 102 and the bi-directional propagation core 130, a second lens inserted between the input port 104 and the bi-directional propagation core 130, and a third lens inserted between the network port 106 and the bi-directional propagation core 130. Alternately or additionally, the output port 102 may include the first lens, the input port 104 may include the second lens, and the network port 106 may include the third lens.

The network port 106 may be mechanically and/or optically coupled to a fiber optic cable in a fiber optic communication network for transmitting and/or receiving signals (e.g., light beams) to and/or from the fiber optic cable. The network port 106 may be optically coupled to the bi-directional propagation core 130. For example, the network port 106 may be optically coupled to a PBS 122 of the bi-directional propagation core 130 for delivering and/or receiving signals to and/or from the PBS 122.

The input port 104 may be optically coupled to the bi-directional propagation core 130. For example, the input port 104 may be optically coupled to a PBS 114 of the bi-directional propagation core 130. The input port 104 may deliver transmission signals to the PBS 114 of the bi-directional propagation core 130, causing the bi-directional propagation core 130 to pass the transmission signals to the network port 106. The input port 104 may include or may be optically coupled to a laser diode or other optical signal source that generates the transmission signals. The laser diode may be disposed on a transmitter portion of a transceiver or other optoelectronic module.

The output port 102 may be optically coupled to the bi-directional propagation core 130. For example, the output port 102 may be optically coupled to a PBS 108 of the bi-directional propagation core 130. The output port 102 may receive signals from the PBS 108 of the bi-directional propagation core 130 and may pass the received signals to a photodiode or other optical receiver. The output port 102 may include or may be connected to the photodiode. The photodiode may be disposed on a receiver portion of a transceiver or other optoelectronic module.

In some embodiments, each port 102, 104, and 106 may include associated optical fibers and connectors between the optical fibers and the optical circulator 100. For example, standard form factor connectors, ferrules, and other types of optical connectors may be implemented. Alternately, non-standard form factor connectors, ferrules, and other types of optical connectors may be implemented. Although the input port 104 and the output port 102 are illustrated at the same end of the optical circulator 100 while the network port 106 is illustrated at another end of the optical circulator 100, more generally, positions of the input port 104, the output port 102, and the network port 106 may be varied. For example, the network port 106 may be disposed at the same end as the input port 104 while the output port 102 may be disposed at another end of the optical circulator 100. In some embodiments, the input port 104 may only input signals to the PBS 114, the output port 102 may only receive signals from the PBS 108, and the network port 106 may input and receive signals to and from the PBS 122.

The bi-directional propagation core 130 is generally denoted using dot-dash lines in FIG. 1. In some embodiments, the bi-directional propagation core 130 may be configured to simultaneously pass a transmission signal from the input port 104 to the network port 106 in a transmit direction 160 and a received signal from the network port 106 to the output port 102 in a receive direction 162.

The bi-directional propagation core 130 may include various optical components that may pass, reflect, refract, and/or change a polarization state of a light beam that propagates through the bi-directional propagation core 130. For example, the bi-directional propagation core 130 may include the PBS 122, a first polarization shifting assembly that includes wave plates 118 and 120 and a Faraday rotator 116, the PBS 114, a second polarization shifting assembly that includes wave plates 110 and 112, and the PBS 108. The PBS 122 may be optically coupled to the network port 106 on one side and to the wave plates 118 and 120 on another side. The Faraday rotator 116 may be optically coupled to the wave plates 118 and 120 on one side and to the PBS 114 on another side. The wave plates 110 and 112 may be optically coupled to the PBS 114 on one side and the PBS 108 on another side. The PBS 108 may also be optically coupled to the output port 102. The PBS 114 may be optically coupled to the input port 104.

The PBS 108, 114, and/or 122 may control the passage of light that propagates through the PBS 108, 114, and/or 122 depending on a polarization state of the light. The PBS 108, 114, and/or 122 may be constructed using birefringent materials. A birefringent material may include a material having two indices of refraction associated with it. Light passing through the birefringent material may be split into two orthogonal beams, an ordinary beam in which the primary index of refraction affects travel according to Snell's law for the primary index of refraction, and an extraordinary beam in which the secondary index of refraction affects travel according to Snell's law for the secondary index of refraction. If light is input into a PBS at a polarization state that matches the axis of one of the indices of refraction, the light may not be split, but may travel through the PBS according to the index of refraction corresponding to the polarization state of the light.

In some embodiments, each of the PBS 108, 114, and 122 may include a corresponding rectangular cuboid constructed from two triangular glass prisms and a parallelepiped glass prism. For example, a base of a first triangular glass prism may be coupled to a first side of the parallelepiped glass prism and a base of a second triangular glass prism may be coupled to a second side of the parallelepiped glass prism using polyester, epoxy, urethane-based adhesives, or other suitable adhesive(s), so that a rectangular cuboid may be formed. In some embodiments, the first triangular glass prism, the parallelepiped glass prism, and the second triangular glass prism may be optically bonded together without using epoxy (e.g., epoxy free). The second side of the parallelepiped glass prism may be in parallel with the first side of the parallelepiped glass prism. Alternatively, each of the PBS 108, 114, and 122 may include a corresponding rectangular cuboid constructed from two beam splitter cubes. Each beam splitter cube may include two triangular glass prisms that are coupled together at their bases using polyester, epoxy, urethane-based adhesives, or other suitable adhesive(s).

In some embodiments, coating may be deposited on two sides of the parallelepiped glass prism, where the two sides share interfaces with the two triangular glass prisms, respectively. Thus, "p" polarization light (marked with a vertical hash marker in FIGS. 1 and 2) may be transmitted through the PBS, and "s" polarization light (marked with a dot in FIGS. 1 and 2) may be reflected. Alternatively, the coating may be deposited on one of the two interfaces which serves as a beam splitter or combiner for lights with two orthogonal polarization states, and the other interface may be coated with higher reflection thin film or metallic coating.

The Faraday rotator 116 may rotate a polarization state of an input light beam based on an initial polarization orientation of the input light beam. The Faraday rotator 116 may be in direct contact with one surface of the PBS 114 in some embodiments, although it is illustrated as spaced apart from the PBS 114 in FIG. 1. Alternatively or additionally, the Faraday rotator 116 may be in direct contact with one surface of the wave plate 118 and/or one surface of the wave plate 120 in some embodiments, although it is illustrated as spaced apart from the wave plates 118 and 120 in FIG. 1. Alternatively, the Faraday rotator 116 may be separated from the PBS 114 and the wave plates 118 and 120, thereby creating air gaps between the Faraday rotator 116, the PBS 114, and the wave plates 118 and 120. The Faraday rotator 116 may be fabricated from a magneto-optic material, such as yttrium iron garnet (YIG) crystals, or other material that may provide the optical properties or characteristics associated with the Faraday rotator 116.

The wave plates 118, 120, 110, and 112 may include half-wave plates or any other suitable wave plates. In some embodiments, a wave plate may alter a polarization state of a light beam that travels through it. Alternatively, a wave plate may not change a polarization state of a light beam that travels through it. A wave plate may be made from birefringent materials, such as crystal quartz.

In some embodiments, the network port 106 may receive a signal from the fiber optic cable and may pass the received signal to the PBS 122. In FIG. 1, example propagation paths for the received signal through the optical circulator 100 are illustrated by ray traces 152, 152A, 152B, and 152A/B. In some embodiments, the ray traces 152, 152A, 152B, and 152A/B may also be referred to as a light beam 152, light beam components 152A and 152B, and a light beam 152A/B, respectively.

The received signal may generally include an unpolarized light beam (e.g., the light beam 152), since the received signal may be received at the network port 106 after being transmitted through a segment of optical fibers. In FIGS. 1 and 2, a light beam with an in-plane polarization state may be indicated by a vertical hash marker along a corresponding propagation path. A light beam with an out-of-plane or orthogonal polarization state may be indicated by a dot marker along a corresponding propagation path. A light beam with a polarization state rotated about midway between the in-plane polarization state and the out-of-plane polarization state may be indicated by a slanted hash marker along a corresponding propagation path. An unpolarized light beam may be indicated by both dot markers and vertical hash markers along a corresponding propagation path. For example, the light beam 152 is marked using dot markers and vertical hash markers to indicate that the light beam 152 includes beam components with an in-plane polarization state and beam components with an out-of-plane polarization state. Throughout the disclosure, the term "in-plane" may be referred to as in a plane of a drawing paper, while the term "out-of-plane" may be referred to as out of the plane of the drawing paper. The in-plane polarization state may be orthogonal or substantially orthogonal to the out-of-plane polarization state.

The PBS 122 may split the unpolarized light beam 152 into a first beam component 152A with an in-plane polarization state and a second beam component 152B with an out-of-plane polarization state. The PBS 122 may pass the first beam component 152A to the wave plate 118 and the second beam component 152B to the wave plate 120.

The wave plate 118 may be configured to rotate the polarization state of the first beam component 152A by (positive or negative) 45 degrees. The first beam component 152A may continue to propagate through the Faraday rotator 116, which may be configured to rotate the polarization state of the first beam component 152A by another 45 degrees in the same direction. As a result, the first beam component 152A that propagates through the wave plate 118 and the Faraday rotator 116 may be changed from the in-plane polarization state to the out-of-plane polarization state.

The wave plate 120 may be configured to rotate a polarization state of the second beam component 152B by positive (or negative) 45 degrees so that the polarization states of beam components 152B and 152A are parallel. The second beam component 152B may continue to propagate through the Faraday rotator 116 and may be changed from the in-plane polarization state to the out-of-plane polarization state as the same way as 152A. In some embodiments, the wave plate 118 may be oriented at or about 22.5 degrees and the wave plate 120 may be oriented at or about 67.5 degrees in a same coordinate system. Other configurations for the wave plates 118 and 120 are possible. As used herein, the term "oriented at" as applied to a wave plate, such as a half-wave plate or a quarter-wave plate, refers to the orientation of the optical axis angle of a wave plate crystal with respect to the signal or light beam that passes therethrough.

The PBS 114 may receive the first beam component 152A and the second beam component 152B from the Faraday rotator 116. The PBS 114 may pass the first beam component 152A to the wave plate 112 and the second beam component 152B to the wave plate 110.

The wave plate 110 may be configured to rotate the polarization state of the second beam component 152B by 90 degrees. As a result, the second beam component 152B that propagates through the wave plate 110 may be changed from the out-of-plane polarization state to the in-plane polarization state. The wave plate 112 may be configured to rotate the polarization state of the first beam component 152A by 0 degree or 180 degrees, or may be replaced with a glass plate with the same optical length as the wave plate 110. As a result, the first beam component 152A that propagates through the wave plate 112 may maintain the out-of-plane polarization state. In some embodiments, the wave plate 110 may be oriented at or about 45 degrees and the wave plate 112 may be oriented at or about 0 degree or 90 degrees in the same coordinate system. Other configurations for the wave plates 110 and 112 are possible.

The PBS 108 may receive the first beam component 152A and the second beam component 152B from the wave plates 112 and 110, respectively. The PBS 108 may aggregate the first beam component 152A and the second beam component 152B to form a light beam 152A/B with mixed polarization. The PBS 108 may pass the light beam 152A/B to the output port 102. The light beam 152A/B may include the same or similar information as the light beam 152.

In FIG. 1, both light beam components 152A and 152B split from the unpolarized light beam 152 may propagate through the PBS 122, Faraday rotator 116, PBS 114, and PBS 108 in common, while the light beam component 152A may propagate through the wave plates 118 and 112 and the light beam component 152B may propagate through the wave plates 120 and 110.

In some embodiments, the input port 104 may deliver a transmission signal to the PBS 114. For example, a laser diode optically coupled to the input port 104 may send a transmission signal (e.g., a light beam) to the PBS 114. The transmission signal may include a linear polarized light beam 150 with an in-plane polarization state. For example, the linear polarized light beam 150 may be generated by a linear polarized optical signal source, such as a distributed feedback (DFB) laser or a distributed Bragg Reflector (DBR) laser. A propagation path of the linear polarized light beam 150 through the optical circulator 100 is illustrated using dashed lines in FIG. 1.

In some embodiments, an optical isolator 132 may be inserted between the input port 104 and the PBS 114 to improve isolation. The optical isolator 132 is illustrated using dotted lines in FIG. 1 to indicate that it is an optional feature of the optical circulator 100. The optical isolator 132 may prevent unwanted feedback into an optical oscillator such as a laser cavity. The optical isolator 132 may increase the isolation to be greater than 25 decibels (dB), 35 dB, or another value. The optical isolator 132 may include a free space isolator, such as an isolator that includes a first polarizer, a garnet, a second polarizer, and a half-wave plate (PGP+HWP). The first polarizer, the garnet, and the second polarizer (PGP) may rotate the polarization state of the light beam 150 by 45 degrees, while the half-wave plate (HWP) may rotate the polarization state of the light beam 150 by another 45 degrees in an opposite direction. As a result, the polarization state of the light beam 150 remains unchanged after passing the optical isolator 132. The half-wave plate may be oriented at or about 22.5 degrees. In some embodiments, 2 or more stage isolators (such as PGPGP+HWP) may be used to provide higher isolation than PGP+HWP. The HWP may be oriented at positive or negative 45 degrees to maintain the polarization in plane.

The PBS 114 may pass the linear polarized light beam 150 to the Faraday rotator 116. For example, the linear polarized light beam 150 may propagate through the PBS 114 without reflection. The Faraday rotator 116 may rotate the polarization state of the linear polarized light beam 150 by 45 degrees and the wave plate 120 may rotate the polarization state of the linear polarized light beam 150 by another 45 degrees in the same direction. As a result, the polarization state of the linear polarized light beam 150 that propagates through the Faraday rotator 116 and the wave plate 120 may be rotated by 90 degrees. The polarization state of the linear polarized light beam 150 after passing through both the Faraday rotator 116 and the wave plate 120 may be changed from the in-plane polarization state to the out-of-plane polarization state. The PBS 122 may pass the linear polarized light beam 150 received from the wave plate 120 to the network port 106 so that the linear polarized light beam 150 may be delivered to a fiber optic cable connected to the network port 106.

FIG. 2 is a block diagram illustrating another example optical circulator 200, arranged in accordance with at least some embodiments described herein. The optical circulator 200 may include the input port 104, the output port 102, the network port 106, a bi-directional propagation core 230, and any other suitable elements for an optical circulator.

The bi-directional propagation core 230 is generally denoted using dot-dash lines in FIG. 2. In some embodiments, the bi-directional propagation core 230 may be configured to simultaneously pass a transmission signal from the input port 104 to the network port 106 in the transmit direction 160 and a received signal from the network port 106 to the output port 102 in the receive direction 162.

The bi-directional propagation core 230 may include the PBS 122, the first polarization shifting assembly that includes the wave plates 118 and 120 and the Faraday rotator 116, the PBS 114, the second polarization shifting assembly that includes the wave plates 110 and 112, the PBS 108, a third polarization shifting assembly that includes wave plates 210 and 212, and a PBS 208. The wave plates 210 and 212 may include half-wave plates or other suitable types of wave plates. The wave plates 210 and 212 may be optically coupled to the PBS 114 on one side and the PBS 208 on another side. The PBS 208 may be optically coupled to the input port 104.

The bi-directional propagation core 230 may be configured to pass a received signal (e.g., the unpolarized light beam 152) from the network port 106 to the output port 102 by performing operations similar to those described above with reference to the bi-directional propagation core 130 of FIG. 1. The description will not be repeated here.

In some embodiments, the input port 104 may deliver a transmission signal to the PBS 208. For example, an optical signal source coupled to the input port 104 may send a transmission signal (e.g., a light beam) to the PBS 208. The transmission signal may include an unpolarized light beam 250. For example, the unpolarized light beam 250 may be generated by an unpolarized optical signal source such as a vertical cavity surface emitting laser (VCSEL). Propagation paths for the unpolarized light beam 250 that travels through the optical circulator 200 are illustrated using dashed lines in FIG. 2.

The PBS 208 may split the unpolarized light beam 250 into a first beam component 250A with an in-plane polarization state and a second beam component 250B with an out-of-plane polarization state. The PBS 208 may pass the first beam component 250A to the wave plate 212 and the second beam component 250B to the wave plate 210.

The wave plate 212 may be configured to rotate the polarization state of the first beam component 250A by 0 degree or 180 degrees. As a result, the first beam component 250A that propagates through the wave plate 212 may maintain the in-plane polarization state. In some embodiments, the wave plate 212 may be replaced by a glass plate with the same optical path length as the wave plate 210 to achieve the same effect of maintaining the in-plane polarization state of the first beam component 250A. The wave plate 210 may be configured to rotate the polarization state of the second beam component 250B by 90 degrees. As a result, the second beam component 250B that propagates through the wave plate 210 may be changed from the out-of-plane polarization state to the in-plane polarization state. In some embodiments, the wave plate 210 may be oriented at or about 45 degrees and the wave plate 212 may be oriented at or about 0 degree or 90 degrees in the same coordinate system. Other configurations for the wave plates 210 and 212 are possible.

The first beam component 250A and the second beam component 250B may continue to propagate through the PBS 114 without reflection. The PBS 114 may pass the first beam components 250A and the second beam component 250B to the Faraday rotator 116.

The Faraday rotator 116 may be configured to rotate the polarization state of the first beam component 250A by 45 degrees and may pass the first beam component 250A to the wave plate 120. The wave plate 120 may rotate the polarization state of the first beam component 250A by another 45 degrees in the same direction as the Faraday rotator 116. As a result, the first beam component 250A that propagates through the Faraday rotator 116 and the wave plate 120 may be changed from the in-plane polarization state to the out-of-plane polarization state.

The Faraday rotator 116 may be configured to rotate the polarization state of the second beam component 250B by 45 degrees in a first direction and may pass the second beam component 250B to the wave plate 118. The wave plate 118 may rotate the polarization state of the second beam component 250B by another 45 degrees in a second direction opposite to the first direction. As a result, the second beam component 250B that propagates through the Faraday rotator 116 and the wave plate 118 may maintain the in-plane polarization state.

The PBS 122 may receive the first beam component 250A and the second beam component 250B from the wave plates 120 and 118, respectively. The PBS 122 may aggregate the first beam component 250A and the second beam component 250B to form a light beam 250A/B with mixed orientation. The PBS 122 may pass the light beam 250A/B to the network port 106. The light beam 250A/B may include the same or similar information as the light beam 250. The network port 106 may deliver the light beam 250A/B to a fiber optic cable for transmitting the light beam 250A/B in a fiber optic communication network.

In FIG. 2, both light beam components 250A and 250B split from the unpolarized light beam 250 may propagate through the PBS 208, PBS 114, Faraday rotator 116, and PBS 122 in common, while the light beam component 250A may propagate through the wave plates 212 and 120 and the light beam component 250B may propagate through the wave plates 210 and 118.

Figure 3A:
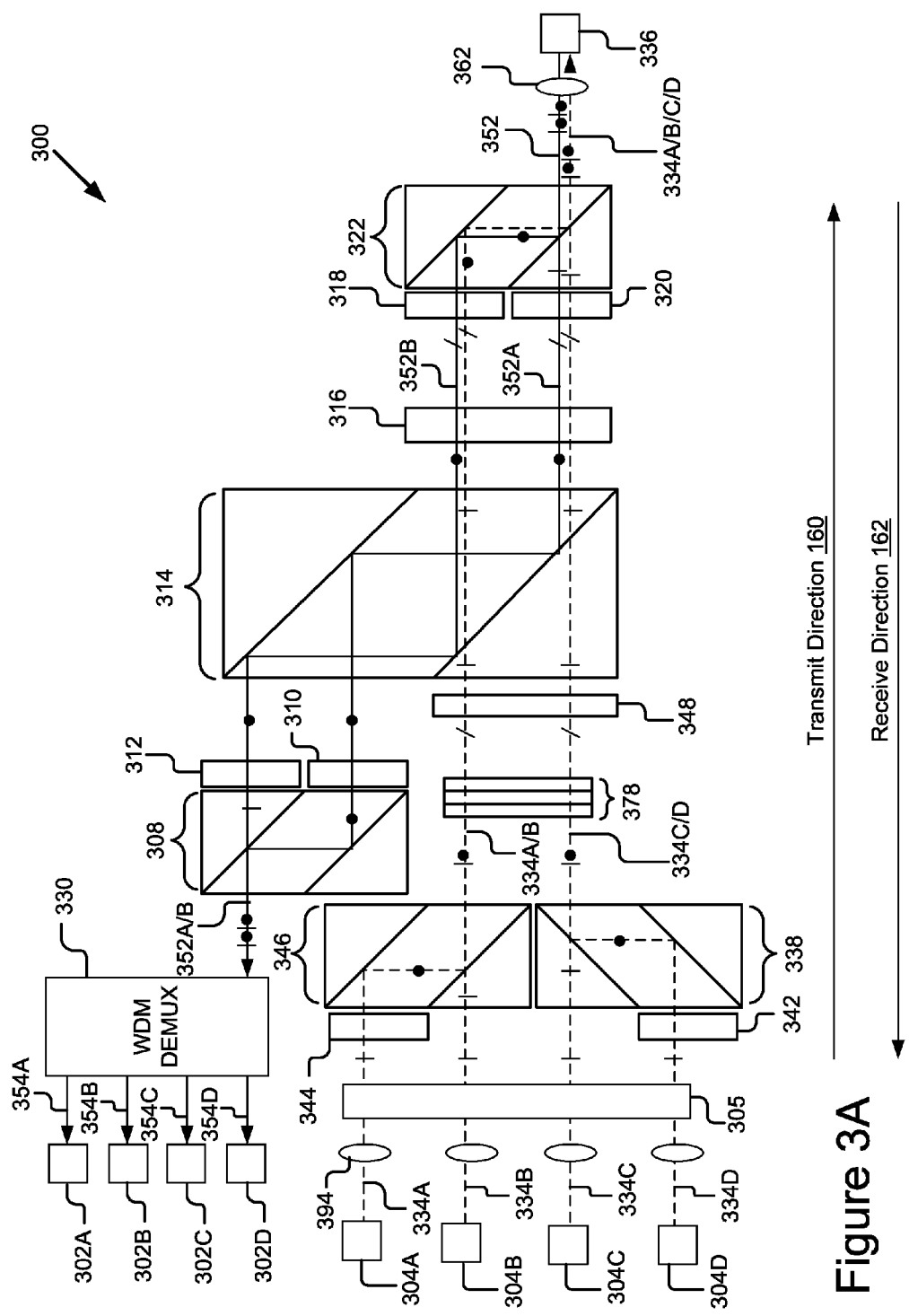
FIGS. 3A-3C illustrate an example optical system configured for bi-directional communication with multiple channels.
Figure 3B:
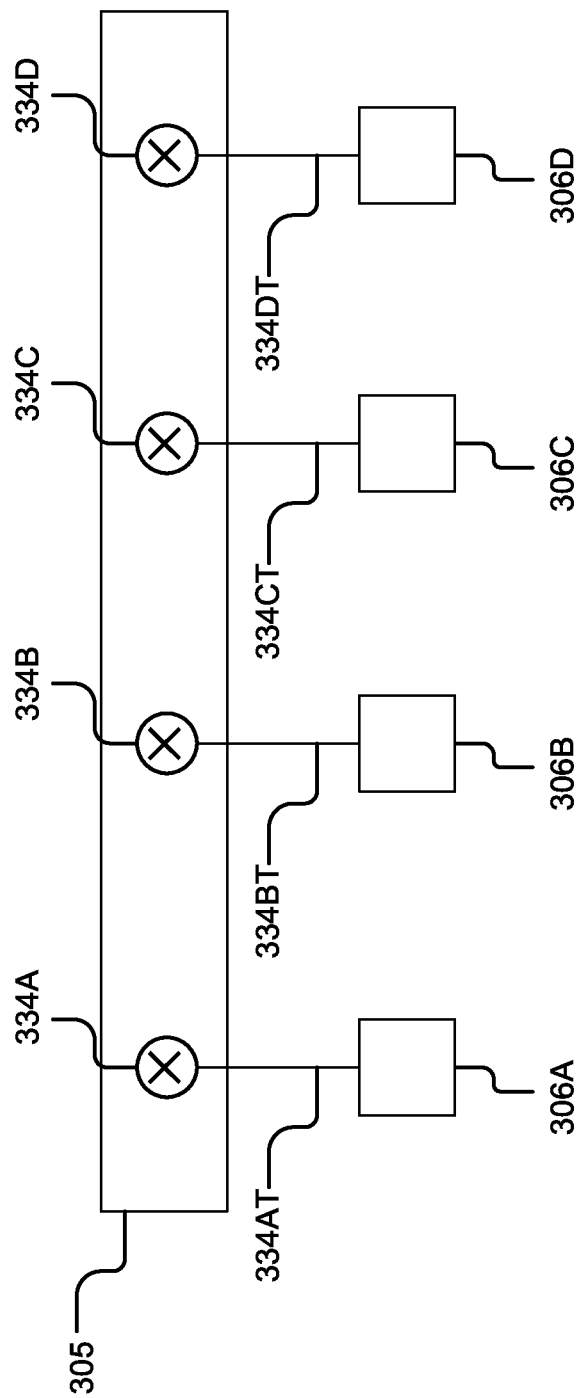
Figure 3C:
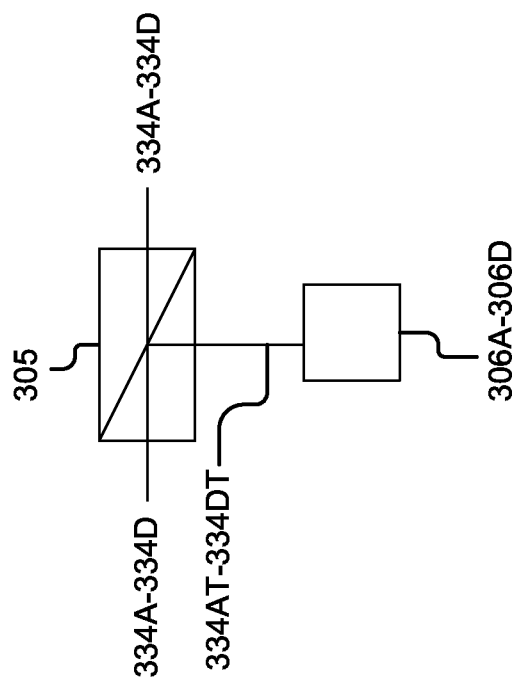

FIGS. 3A-3C illustrate an example optical system 300 configured for bi-directional communication with multiple wavelengths, arranged in accordance with at least some embodiments described herein. Referring to FIG. 3A, the optical system 300 may include input ports 304A, 304B, 304C, 304D (also referred to collectively as 304A-304D), a tap beam splitter 305, lenses 394 inserted between the input ports 304A-304D and the tap beam splitter 305, output ports 302A, 302B, 302C, 302D (also referred to collectively as 302A-302D), a network port 336, wave plates 342, 344, PBS 338, 346, an optical isolator 378, a wave plate 348, a WDM demultiplexer 330, a bi-directional propagation core, a lens 362 between the bi-directional propagation core and the network port 336, and any other suitable elements for the optical system 300. The bi-directional propagation core may include PBS 308, 314, 322, wave plates 312, 310, 318, 320, a Faraday rotator 316, and any other suitable elements for the bi-directional propagation core.

FIGS. 3B and 3C illustrate a portion of the optical system 300 of FIG. 3A that includes the tap beam splitter 305. The view of FIG. 3B is from a position between lenses 394 and the tap beam splitter 305 looking towards the tap beam splitter 305 and at a viewing angle that may be orthogonal to a viewing angle of FIG. 3A. The view of FIG. 3C is at a viewing angle orthogonal to both the viewing angle of FIG. 3A and the viewing angle of FIG. 3B. Referring to FIGS. 3B and 3C, the optical system 300 may further include monitoring photo diodes 306A, 306B, 306C, 306D (also referred to collectively as photo diodes 306A-306D). The view of FIG. 3C is such that only the photo diode 306D is visible, with the other photo diodes 306C, 306B, and 306A positioned behind the photo diode 306D in sequence.

Referring again to FIG. 3A, in some embodiments, the network port 336 may receive a signal from a fiber optic cable and may pass the received signal through the lens 362 to the PBS 322. The received signal may include components with different wavelengths. For example, the received signal may include components with 4 different wavelengths or another number of wavelengths.

The received signal may generally include an unpolarized light beam (e.g., a light beam 352). The PBS 322 may split the unpolarized light beam 352 into a first beam component 352A with an in-plane polarization state and a second beam component 352B with an out-of-plane polarization state. The PBS 322 may pass the first beam component 352A to the wave plate 320 and the second beam component 352B to the wave plate 318.

The wave plate 320 may be configured to rotate the polarization state of the first beam component 352A by (positive or negative) 45 degrees. The first beam component 352A may continue to propagate through the Faraday rotator 316, which may be configured to rotate the polarization state of the first beam component 352A by another 45 degrees in the same direction. As a result, the first beam component 352A that propagates through the wave plate 320 and the Faraday rotator 316 may be changed from the in-plane polarization state to the out-of-plane polarization state.

The wave plate 318 may be configured to rotate a polarization state of the second beam component 352B by positive (or negative) 45 degrees so that the polarization states of beam components 352B and 352A are parallel. The second beam component 352B may continue to propagate through the Faraday rotator 316 to output the beam component 352B with the out-of-plane polarization state. In some embodiments, the wave plate 320 may be oriented at or about 22.5 degrees and the wave plate 318 may be oriented at or about 67.5 degrees in a same coordinate system. Other configurations for the wave plates 318 and 320 are possible.

The PBS 314 may receive the first beam component 352A and the second beam component 352B from the Faraday rotator 316. The PBS 314 may pass the first beam component 352A to the wave plate 310 and the second beam component 352B to the wave plate 312.

The wave plate 312 may be configured to rotate the polarization state of the second beam component 352B by 90 degrees. As a result, the second beam component 352B that propagates through the wave plate 312 may be changed from the out-of-plane polarization state to the in-plane polarization state. The wave plate 310 may be configured to rotate the polarization state of the first beam component 352A by 0 degree or 180 degrees, or may be replaced with a glass plate with the same optical length as the wave plate 312. As a result, the first beam component 352A that propagates through the wave plate 310 may maintain the out-of-plane polarization state. In some embodiments, the wave plate 312 may be oriented at or about 45 degrees and the wave plate 310 may be oriented at or about 0 degree or 90 degrees in the same coordinate system. Other configurations for the wave plates 310 and 312 are possible.

The PBS 308 may receive the first beam component 352A and the second beam component 352B from the wave plates 310 and 312, respectively. The PBS 308 may aggregate the first beam component 352A and the second beam component 352B to form a light beam 352A/B with mixed polarization. The PBS 308 may pass the light beam 352A/B to the WDM demultiplexer 330. The light beam 352A/B may include the same or similar information as the light beam 352 with multiple wavelengths such as four wavelengths.

The WDM demultiplexer 330 may split the light beam 352A/B into multiple components such as components 354A, 354B, 354C, and 354D, with each component having a different wavelength. The WDM demultiplexer 330 may pass the components 354A-354D with different wavelengths to the output ports 302A-302D, respectively.

In some embodiments, the input port 304A may deliver a first transmission signal to the tap beam splitter 305 through a first lens 394. For example, a laser diode optically coupled to the input port 304A may send a transmission signal (e.g., a light beam) to the tap beam splitter 305 through the first lens 394. The transmission signal may include a linear polarized light beam 334A with an in-plane polarization state. For example, the linear polarized light beam 334A may be generated by a linear polarized optical signal source, such as a distributed feedback (DFB) laser or a distributed Bragg Reflector (DBR) laser. Similarly, the input port 304B may deliver a second transmission signal (e.g., a linear polarized light beam 334B) to the tap beam splitter 305 through a second lens. The input port 304C may deliver a third transmission signal (e.g., a linear polarized light beam 334C) to the tap beam splitter 305 through a third lens. The input port 304D may deliver a fourth transmission signal (e.g., a linear polarized light beam 334D) to the tap beam splitter 305 through a fourth lens. The first, second, third, and fourth transmission signals or linear polarized light beams 334A-334D may occupy different wavelength channels, e.g., they may be centered at different wavelengths. The linear polarized light beams 334A-334D may also be referred to as light beams 334A-334D.

Referring again to FIGS. 3B and 3C, the tap beam splitter 305 may tap, or redirect, a relatively small portion (e.g., 5%) of each of the light beams 334A-334D to the photo diodes 306A-306D as, respectively, tapped beams 334AT, 334BT, 334CT, 334DT (also referred to collectively as tapped beams 334AT-334DT). The light beams 334A-334D may otherwise pass through the tap beam splitter 305 to the wave plate 344, the PBS 346, the PBS 338, and/or the wave plate 342. The photo diodes 306A-306D may measure the power, wavelength, and/or other properties of the tapped beams 334AT-334DT, from which the power, wavelength, and/or other properties of the light beams 334A-334D may be determined. Alternatively or additionally, a feedback loop including the photo diodes 306A-306D may be implemented to adjust and/or maintain the power, wavelength, and/or other properties of each of the light beams 334A-334D at or near a particular value or values.

Returning to FIG. 3A, the wave plate 344, the PBS 346, the PBS 338, and the wave plate 342 may respectively receive the light beam 334A, the light beam 334B, the light beam 334C, and the light beam 334D. The wave plate 344 may be configured to rotate the polarization state of the light beam 334A from the in-plane polarization state to the out-of-plane polarization state. The wave plate 344 may then pass the light beam 334A to the PBS 346. The PBS 346 may aggregate the light beams 334A and 334B to form a light beam 334A/B. The PBS 346 may pass the light beam 334A/B to the optical isolator 378. In some embodiments, the optical isolator 378 may include PGP. The light beam 334A/B may have a mixed polarization. The optical isolator 378 may rotate the light beam 334A/B by positive or negative 45 degrees such that a portion of the light beam 334A/B with in-plane polarization and a portion of the light beam 334A/B with out-of-plane polarization have the same polarization. The wave plate 348 may rotate the light beam 334A/B by another 45 degrees in the same direction so that the light beam 334A/B may be changed to the in-plane polarization state.

The wave plate 342 may be configured to rotate the polarization state of the light beam 334D from the in-plane polarization state to the out-of-plane polarization state. The wave plate 342 may then pass the light beam 334D to the PBS 338. The PBS 338 may aggregate the light beams 334C and 334D to form a light beam 334C/D. The PBS 338 may pass the light beam 334C/D to the optical isolator 378. The light beam 334C/D may have a mixed polarization. The optical isolator 378 may rotate the light beam 334C/D by positive or negative 45 degrees such that a portion of the light beam 334C/D with in-plane polarization and a portion of the light beam 334C/D with out-of-plane polarization have the same polarization. The wave plate 348 may rotate the light beam 334C/D by another 45 degrees in the same direction so that the light beam 334C/D may be changed to the in-plane polarization state.

The light beams 334A/B and 334C/D may continue to propagate through the PBS 314 without reflection. The PBS 314 may pass the light beams 334A/B and 334C/D to the Faraday rotator 316.

The Faraday rotator 316 may be configured to rotate the polarization state of the light beam 334A/B by 45 degrees and may pass the light beam 334A/B to the wave plate 318. The wave plate 318 may rotate the polarization state of the light beam 334A/B by another 45 degrees in the same direction as the Faraday rotator 316. As a result, the light beam 334A/B that propagates through both the Faraday rotator 316 and the wave plate 318 may be changed from the in-plane polarization state to the out-of-plane polarization state.

The Faraday rotator 316 may be configured to rotate the polarization state of the light beam 334C/D by 45 degrees in a first direction and may pass the light beam 334C/D to the wave plate 320. The wave plate 320 may rotate the polarization state of the light beam 334C/D by another 45 degrees in a second direction opposite to the first direction. As a result, the light beam 334C/D that propagates through both the Faraday rotator 316 and the wave plate 320 may maintain the in-plane polarization state.

The PBS 322 may receive the light beams 334A/B and 334C/D from the wave plates 318 and 320, respectively. The PBS 322 may aggregate the light beams 334A/B and 334C/D to form a light beam 334A/B/C/D with mixed orientation. The PBS 322 may pass the light beam 334A/B/C/D to the network port 336 through the lens 362. The light beam 334A/B/C/D may include the information of the light beams 334A-334D. The network port 336 may deliver the light beam 334A/B/C/D to a fiber optic cable for transmitting the light beam 334A/B/C/D in a fiber optic communication network.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical circulator integrated into a transceiver to achieve bi-directional communication in a fiber optic communication network, the optical circulator comprising:
    a bi-directional propagation core configured to pass a transmission signal in a transmit direction and a received signal in a receive direction, the bi-directional propagation core including:
    a first polarization beam splitter (PBS);
    a first polarization shifting assembly optically coupled to the first PBS;
    a second PBS optically coupled to the first polarization shifting assembly;
    a second polarization shifting assembly optically coupled to the second PBS; and
    a third PBS optically coupled to the second polarization shifting assembly;
    wherein the first polarization shifting assembly is located between the first PBS and the second PBS, and the second polarization shifting assembly is located between the second PBS and the third PBS;
    wherein the bi-directional propagation core passes the received signal from the first PBS to the third PBS through the first polarization shifting assembly, the second PBS, and the second polarization shifting assembly;
    wherein the bi-directional propagation core passes the transmission signal from the second PBS to the first PBS through the first polarization shifting assembly;

an input port optically coupled to the second PBS of the bi-directional propagation core, the input port configured to deliver the transmission signal to the second PBS;

an output port optically coupled to the third PBS of the bi-directional propagation core, the output port configured to receive the received signal from the third PBS; and a network port optically coupled to the first PBS of the bi-directional propagation core, the network port configured to receive the transmission signal from the first PBS and deliver the transmission signal to a fiber optic cable, the network port further configured to receive the received signal from the fiber optic cable and deliver the received signal to the first PBS.

2. The optical circulator of claim 1, wherein the first polarization shifting assembly includes a first wave plate optically coupled to the first PBS, a second wave plate optically coupled to the first PBS, and a Faraday rotator optically coupled to the first wave plate, the second wave plate, and the second PBS.

3. The optical circulator of claim 2, wherein:
the received signal includes an unpolarized light beam;
the first PBS splits the unpolarized light beam into a first beam component with a first polarization state and a second beam component with a second polarization state that is orthogonal to the first polarization state;
the first PBS passes the first beam component to the first wave plate and the second beam component to the second wave plate;
the first wave plate and the Faraday rotator through which the first beam component propagates are configured to rotate the first beam component from the first polarization state to the second polarization state; and
the second wave plate and the Faraday rotator through which the second beam component propagates are configured to maintain the second beam component in the second polarization state.

4. The optical circulator of claim 3, wherein the first beam component and the second beam component propagate through the first PBS, the Faraday rotator, the second PBS, and the third PBS in common.

5. The optical circulator of claim 3, wherein:
the second polarization shifting assembly includes a third wave plate and a fourth wave plate that are optically coupled to the second PBS and the third PBS;
the third wave plate through which the first beam component propagates is configured to rotate the first beam component from the second polarization state to the first polarization state; and
the fourth wave plate through which the second beam component propagates is configured to maintain the second beam component in the second polarization state.

6. The optical circulator of claim 5, wherein:
the third PBS aggregates the first beam component that propagates through the third wave plate and the second beam component that propagates through the fourth wave plate; and
the third PBS passes the aggregated first beam component and second beam component to the output port.

7. The optical circulator of claim 2, wherein:
the transmission signal from the input port includes a linear polarized light beam;
the second PBS passes the linear polarized light beam to the Faraday rotator;

the Faraday rotator and the second wave plate through which the linear polarized light beam propagates are configured to rotate a polarization state of the linear polarized light beam by 90 degrees; and the first PBS passes the linear polarized light beam received from the second wave plate to the network port.

8. The optical circulator of claim 2, wherein the first wave plate is oriented at about 22.5 degrees and the second wave plate is oriented at about 67.5 degrees in a common coordinate system.

9. The optical circulator of claim 1, further comprising an optical isolator, wherein the optical isolator is located between the input port and the second PBS and is configured to pass the transmission signal from the input port to the second PBS.

10. The optical circulator of claim 9, wherein the optical isolator includes a free space isolator.

11. An optical circulator integrated into a transceiver to achieve bi-directional communication in a fiber optic network, the optical circulator comprising:
a bi-directional propagation core configured to pass a transmission signal in a transmit direction and a receive signal in a receiving direction, the bi-directional propagation core including:
a first polarization beam splitter (PBS);
a first polarization shifting assembly optically coupled to the first PBS;
a second PBS optically coupled to the first polarization shifting assembly;
a second polarization shifting assembly optically coupled to the second PBS;
a third PBS optically coupled to the second polarization shifting assembly;
a third polarization shifting assembly optically coupled to the second PBS; and
a fourth PBS optically coupled to the third polarization shifting assembly;
wherein the bi-directional propagation core passes the received signal from the first PBS to the third PBS through the first polarization shifting assembly, the second PBS, and the second polarization shifting assembly;
wherein the bi-directional propagation core passes the transmission signal from the fourth PBS to the first PBS through the third polarization shifting assembly, the second PBS, and the first polarization shifting assembly;
an input port optically coupled to the fourth PBS of the bi-directional propagation core, the input port configured to deliver the transmission signal to the fourth PBS;
an output port optically coupled to the third PBS of the bi-directional propagation core, the output port configured to receive the received signal from the third PBS; and
a network port optically coupled to the first PBS of the bi-directional propagation core, the network port configured to receive the transmission signal from the first PBS and deliver the transmission signal to a fiber optic cable, the network port further configured to receive the received signal from the fiber optic cable and deliver the received signal to the first PBS.

12. The optical circulator of claim 11, wherein the first polarization shifting assembly includes a first wave plate optically coupled to the first PBS, a second wave plate optically coupled to the first PBS, and a Faraday rotator optically coupled to the first wave plate, the second wave plate, and the second PBS.

13. The optical circulator of claim 12, wherein:
the received signal includes an unpolarized light beam;
the first PBS splits the unpolarized light beam into a first beam component with a first polarization state and a second beam component with a second polarization state that is orthogonal to the first polarization state;
the first PBS passes the first beam component to the first wave plate and the second beam component to the second wave plate;
the first wave plate and the Faraday rotator through which the first beam component propagates are configured to rotate the first beam component from the first polarization state to the second polarization state; and
the second wave plate and the Faraday rotator through which the second beam component propagates are configured to maintain the second beam component in the second polarization state.

14. The optical circulator of claim 13, wherein the first beam component and the second beam component propagate through the first PBS, the Faraday rotator, the second PBS, and the third PBS in common.

15. The optical circulator of claim 14, wherein:
the second polarization shifting assembly includes a third wave plate and a fourth wave plate that are optically coupled to the second PBS and the third PBS;
the third wave plate through which the first beam component propagates is configured to rotate the first beam component from the second polarization state to the first polarization state; and
the fourth wave plate through which the second beam component propagates is configured to maintain the second beam component in the second polarization state.

16. The optical circulator of claim 15, wherein:
the third PBS aggregates the first beam component that propagates through the third wave plate and the second beam component that propagates through the fourth wave plate; and
the third PBS passes the aggregated first beam component and second beam component to the output port.

17. The optical circulator of claim 12, wherein:
the transmission signal from the input port includes an unpolarized light beam;
the third polarization shifting assembly includes a fifth wave plate and a sixth wave plate that are optically coupled to the second PBS and the fourth PBS;
the fourth PBS splits the unpolarized light beam into a third beam component with a first polarization state and a fourth beam component with a second polarization state that is orthogonal to the first polarization state;
the fourth PBS passes the third beam component to the fifth wave plate and the fourth beam component to the sixth wave plate;
the fifth wave plate through which the third beam component propagates is configured to maintain the third beam component in the first polarization state; and
the sixth wave plate through which the fourth beam component propagates is configured to rotate the fourth beam component from the second polarization state to the first polarization state.

18. The optical circulator of claim 17, wherein:
the second PBS passes the third beam component and the fourth beam component to the Faraday rotator, respectively;
the Faraday rotator and the second wave plate through which the third beam component propagates are configured to rotate the third beam component from the first polarization state to the second polarization state;
the Faraday rotator and the first wave plate through which the fourth beam component propagates are configured to maintain the fourth beam component in the first polarization state;
the first PBS aggregates the third beam component that propagates through the second wave plate and the fourth beam component that propagates through the first wave plate; and
the first PBS passes the aggregated third beam component and fourth beam component to the network port.

19. The optical circulator of claim 12, wherein the first wave plate is oriented at about 22.5 degrees and the second wave plate is oriented at about 67.5 degrees in a common coordinate system.

20. An optical circulator integrated into a transceiver to achieve bi-directional communication in a fiber optic network, the optical circulator comprising:
a bi-directional propagation core configured to pass a transmission signal in a transmit direction and a received signal in a receive direction, the bi-directional propagation core including:
a first polarization beam splitter (PBS);
a first polarization shifting assembly optically coupled to the first PBS;
a second PBS optically coupled to the first polarization shifting assembly;
a second polarization shifting assembly optically coupled to the second PBS;
a third PBS optically coupled to the second polarization shifting assembly;
a third polarization shifting assembly optically coupled to the second PBS; and
a fourth PBS optically coupled to the third polarization shifting assembly;
wherein:
the first polarization shifting assembly is located between the first PBS and the second PBS, and the second polarization shifting assembly is located between the second PBS and the third PBS;
the bi-directional propagation core propagates the received signal from the first PBS to the third PBS through the first polarization shifting assembly, the second PBS, and the second polarization shifting assembly;
the transmission signal includes an unpolarized light beam;
the fourth PBS splits the unpolarized light beam into a first beam component with a first polarization state and a second beam component with a second polarization state that is orthogonal to the first polarization state;
the fourth PBS passes the first beam component and the second beam component to the third polarization shifting assembly;
the third polarization shifting assembly maintains the first beam component in the first polarization state and rotates the second beam component from the second polarization state to the first polarization state;
the second PBS passes the first beam component and the second beam component with the first polarization state to the first polarization shifting assembly;
the first polarization shifting assembly rotates the first beam component from the first polarization state to the second polarization state and maintains the second beam component in the first polarization state; and the first PBS aggregates the first beam component with the second polarization state and the second beam component with the first polarization state to form an aggregated transmission signal;

an input port optically coupled to the fourth PBS of the bi-directional propagation core, the input port configured to deliver the transmission signal to the fourth PBS;

an output port optically coupled to the third PBS of the bi-directional propagation core, the output port configured to receive the received signal from the third PBS; and a network port optically coupled to the first PBS of the bi-directional propagation core, the network port configured to receive the aggregated transmission signal from the first PBS and deliver the aggregated transmission signal to a fiber optic cable, the network port further configured to receive the received signal from the fiber optic cable and deliver the received signal to the first PBS.

* * * * *